G. T. HACKLEY, DEC'D.
S. C. HACKLEY, ADMINISTRATRIX.
VALVE STEM GAGE.
APPLICATION FILED JAN. 31, 1914.
1,219,729. Patented Mar. 20, 1917.
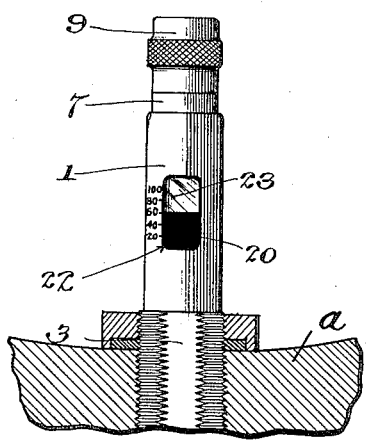
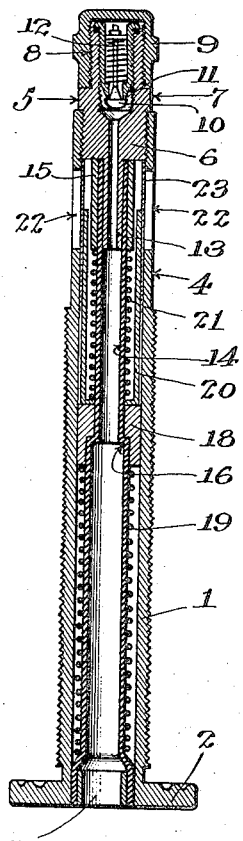
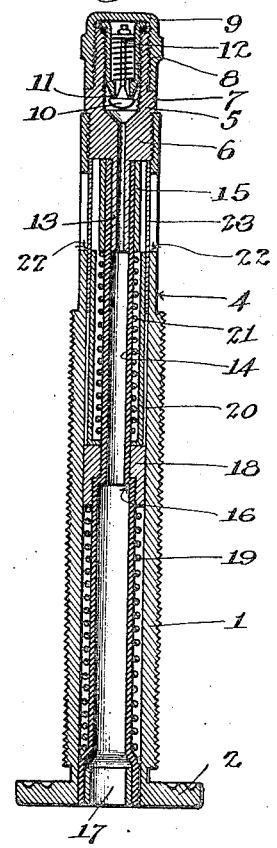
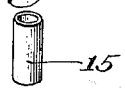
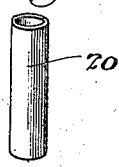
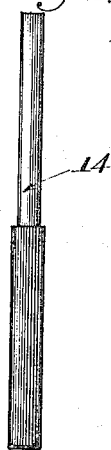
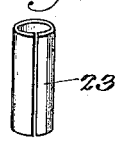
Witnesses:
Inventor:
George T. Hackley.

UNITED STATES PATENT OFFICE.

GEORGE T. HACKLEY, OF LOS ANGELES, CALIFORNIA; SARAH C. HACKLEY, ADMINISTRATRIX OF SAID GEORGE T. HACKLEY, DECEASED.

VALVE-STEM GAGE.

1,219,729.

Specification of Letters Patent.   Patented Mar. 20, 1917.

Application filed January 31, 1914.   Serial No. 815,826.

*To all whom it may concern:*

Be it known that I, GEORGE T. HACKLEY, a citizen of the United States, residing at Los Angeles, in the county of Los Angeles and State of California, have invented a new and useful Valve-Stem Gage, of which the following is a specification.

This invention relates to a valve stem gage embodying a gage constructed as a part of the valve stem of a pneumatic tire.

One of the main objects of the present invention is to provide a gage in which the air acting within the air duct operates an indicator mechanism contained entirely within the valve stem, so that it will be perfectly protected from leakage and injury, and at the same time to provide a stationary and rigid outer end of the valve stem for the attachment of an inflating tube, so that the operation of the gage will not be affected in any manner by the application of the inflating tube to the valve stem, and will not be injured even though the valve stem receive rough usage.

An object of the invention is to provide a novel gage of this character in which the air from within the inflated device will act with diminished force to operate the gage and there will be minimum liability of getting out of order or sticking, and in which the indicator of the gage while indicating pressure will be exposed to produce an easily discernible gage marked so that the eye can readily note the amount of pressure indicated without the necessity of close scrutiny.

Another object is to accomplish this within a minimum length of indicator space so that only a short length of valve stem need to project from the rear end in order to enable the observer to note the indication of the gage with maximum facility and ease.

Another object of the invention is to provide a simple and economical construction of the fewest possible parts.

Referring to the drawings:

Figure 1 is a side elevation of the upper portion of the device, with a portion of the wheel rim in cross section.

Fig. 2 is a longitudinal section through the complete device, showing the parts in position indicating a pressure of sixty pounds.

Fig. 3 is a view similar to Fig. 2, showing the parts when no pressure is in the tire.

Fig. 4 is a side elevation in detail of the rubber tube.

Fig. 5 is a perspective in detail of the upper tube fastening ring.

Fig. 6 is a perspective in detail of the gage tube.

Fig. 7 is a perspective in detail of the lower tube fastener.

Fig. 8 is a perspective in detail of the transparent tube.

Fig. 9 is a longitudinal section through the follower.

The device comprises a valve stem 1 with a flanged head 2 for attachment to the tire as shown. The stem 1 is externally threaded in well known manner, with flattened sides 3. In the present embodiment the threaded portion does not extend throughout the entire length and a smooth cylindrical surface 4 is formed near the outer end of the valve stem. This smooth portion projects inwardly from the rim of the wheel, and is at all times in view and for that reason it is preferable to construct it to present a finished appearance. However, the threads could extend the entire length of the stem.

Rigidly secured to the outer end of the stem 1 is a threaded nipple 5. This nipple is preferably secured by screwing it into the end of the valve stem, as shown, having an inner threaded portion 6 for that purpose, with a flange 7 which seats against the rim of the stem 1, and being externally threaded at 8 for the attachment of an inflating hose or valve cap 9. Within the nipple 5 is a spring pressed valve 10 which is held closed against a seat 11 and has a valve pin 12 which may be depressed when it is desired to permit air to escape from the tire. The spring normally holds the valve shut from any escape of air, but will yield to permit the tire to open when air is forced in from the outer end of the nipple, as in inflating.

The inner end of the nipple 5 has an extension 13 to which is secured the upper end of a rubber tube 14, as by means of a thimble 15. The tube 14 is formed with two diameters, giving an inner annular shoulder 16. The lower end of the tube is secured to the valve stem by an expanded ring 17. A follower 18 which is slidable in the valve stem 1, fits over the rubber tube at the shoulder thereof, and a coil spring 19 encircles the larger portion of the rubber tube below the follower, this coil acting to prevent expansion of the walls of the rubber tube when under pressure, and thus permit of an elongation of this portion of the tube without rubbing against the walls of the valve stem. Resting against the follower 18 is an indicator tube 20 having a flanged lower end and a coil compression spring 21 encircles the upper smaller portion of the rubber tube 14, its lower end bearing against the flanged portion of the indicator tube 20, and its upper end bearing against the thimble 15. The spring 21 is normally expanded and holds the parts normally in position shown in Fig. 3, with the upper edge of the indicator tube in line with the lower edge of an opening 22, formed in the valve stem 1, there preferably being two openings 22 on opposite sides of the valve stem, in order that the position of the indicator tube may be observed, irrespective of whichever way the tire may have been placed on the wheel. The valve stem on account of its flattened sides 3 is always secured to the inner tube of the tire, with one or the other of its flat sides 3 facing outwardly, which insures that one or the other of the openings 22 will always be on the outer side of the valve stem and permit ready inspection of the indicator tube.

In order to exclude dirt and moisture, a transparent tube 23, for example, of celluloid, is arranged within the valve stem, externally of the indicator tube. The indicator tube is preferably black so that it will present a contrast to the surrounding parts and thus enable its position to be readily seen, even from a distance, after the manner of a target. The outer face of the valve stem along the edge of the openings 22 may be provided with pressure indicating numerals, thus 20, 40, 60, 80, 100, whereby the exact pressure within the tire may be determined if desired. For ordinary purposes, however, a mere glance at the device from a distance will give a sufficiently accurate knowledge of the condition of the air pressure. Thus, when it is known that the indicator tube is half way up in the opening, a pressure of sixty pounds is in the tire, this half-way position is readily distinguished without requiring any scrutiny of the scale of figures.

In operation, pressure of the air within the rubber tube acting against the annular shoulder 16 elongates the lower portion of the tube and shortens the upper portion of the tube, overcoming the compression spring 21, and moving up the indicator tube 20 a distance corresponding to the air pressure. As the pressure is increased, the indicator tube will be moved higher up toward the upper end of the opening 22, while when the pressure is diminished it will move lower, and when the pressure is exhausted, it will stand at the lower edge of the opening. The springs 19 and 21 prevent the expansion of the walls of the rubber tube and the follower 18 also prevents expansion of the rubber tube where it is located and maintains an unvarying area of the shoulder 16. The lower spring 19 in the present embodiment does not act to retard the elongation of that portion of the tube and only acts to keep the tube from expanding and rubbing against the walls of the valve stem, while the upper spring 21 acts in both capacities of preventing expansion of the tube laterally and of resisting upward movement of the follower.

It is noted that the rubber tube 14 forms the duct by which the air is applied for the inflating purpose and that the air within said tube acts upon the extensible portion thereof to move the indicator and that the force applied to move said indicator is determined by the area of the shoulder 16 and that since the indicator moves in a chamber that is not subject to the inflating pressure likelihood of leakage is minimized.

It is also to be noted that the duct through which the air is passed is not encroached upon by the indicating mechanism.

What I claim is:

1. A valve stem gage comprising a valve stem having an opening in its side, means inside of the valve stem forming a conduit for fluid, there being a shoulder inside of said conduit, a follower surrounding said conduit to move therewith and shiftable in one direction by movement of the conduit, an indicator in the valve stem operated by movement of the follower and adapted to be viewed through said opening, and spring means tending to shift the follower in the opposite direction.

2. A valve stem gage comprising a valve stem, a nipple screwed in the outer end thereof, a valve in said nipple, a rubber tube secured to said nipple, the other end of the rubber tube being secured to the valve stem, said rubber tube having two internal diameters whereby the pressure in the tire will act to elongate the portion of the tube having the larger diameter, means for resisting such elongation, and an indicating device operated by the elongating movement of the tube.

3. A valve stem gage comprising a valve stem with a valve at its outer end, an extensible tube within said valve stem with its upper end secured in airtight relation to conduct air to said valve, and its lower end secured to the valve stem, the tube having two internal diameters, means for resisting elongation of the larger portion of the tube, and an indicating device operated by the movement of the tube.

4. A valve stem gage comprising a valve stem, a nipple at the outer end thereof, a rubber tube within the valve stem for conducting air from the lower part of the valve stem to the valve, said tube having two internal diameters forming a shoulder, means at such shoulder for resisting movement of the tube, and indicating means operated by the movement of the tube.

5. A valve stem gage comprising a valve stem, a nipple at the outer end thereof, a rubber tube within the valve stem for conducting air from the lower part of the valve stem to the valve, said tube having two internal diameters, means for resisting movement of the tube, indicating means operated by the movement of the tube, and a follower slidable in the valve stem and engaging the tube, said indicating means bearing against said follower.

6. A valve stem gage comprising a valve stem with an opening at its outer end, a rubber tube within said valve stem, the outer end of the tube communicating with said opening, the inner end of the tube being secured to the valve stem to confine the air pressure to the interior of the tube, said tube having two diameters, a coil spring surrounding the smaller diameter of the tube, and opposing longitudinal contraction thereof and preventing lateral expansion, a coil spring surrounding the tube to resist movement of an intermediate portion of the tube, and an indicating device operated by movement of the tube.

7. A valve stem gage comprising a valve stem with an opening at its outer end, a rubber tube within the valve stem with its upper end communicating with said opening, the lower end of the tube being in airtight relation to the valve stem, the tube having two diameters, means for resisting movement of the tube, and a tubular indicator slidable in the valve stem and operated by movement of the tube, the valve stem having an opening to reveal the indicator.

8. A valve stem gage comprising a valve stem with an opening at its outer end, a rubber tube within the valve stem with its upper end communicating with said opening, the lower end of the tube being in airtight relation to the valve stem, the tube having two diameters, means for resisting movement of the tube, a tubular indicator slidable in the valve stem and operated by movement of the tube, the valve stem having an opening to reveal the indicator, and a follower around an intermediate portion of the rubber tube against which the lower end of the indicating tube bears, said resisting means comprising a coil spring within said indicating tube.

9. A valve stem gage comprising a valve stem, a nipple in the outer end thereof with an inner extension, a rubber tube with its upper end connected to said extension and its lower end in airtight relation with the valve stem, the tube having two diameters to cause it to move under air pressure, an indicating tube surrounding the rubber tube and operated by the movement thereof, and a spring surrounding the rubber tube within the indicating tube to resist movement of the rubber tube, the valve stem having an opening to reveal the indicating tube.

10. A valve stem gage comprising a valve stem, a non-slidable nipple in the outer end thereof, a valve in said nipple, a rubber tube within the valve stem with its lower end in airtight relation with the valve stem and its upper end in airtight relation with said nipple, an indicating device operated by the movement of said tube, and means for resisting movement of the tube.

11. In a valve stem gage, a rubber tube with its ends in fixed relation to each other and having two diameters to cause an intermediate portion of the tube to move longitudinally under air pressure, and means for preventing lateral expansion of the tube.

12. A valve stem gage comprising a stationarily mounted valve, a tube having a shoulder in its interior and connected with the valve and movable relative to said valve, and means operative by movement of the tube caused by fluid pressure against the shoulder to indicate the amount of said fluid pressure.

13. A valve stem gage comprising a rubber tube, a stationarily mounted valve to admit fluid to one end of the rubber tube, and means independent of the valve and operative by elongation and contraction of the rubber tube to indicate the amount of air pressure in the rubber tube.

In testimony whereof, I have hereunto set my hand at Los Angeles, California, this 24th day of January, 1914.

GEORGE T. HACKLEY.

In presence of—
 LORRAINE E. DURROW,
 LORA M. BOWERS.